United States Patent Office 3,465,860
Patented Sept. 9, 1969

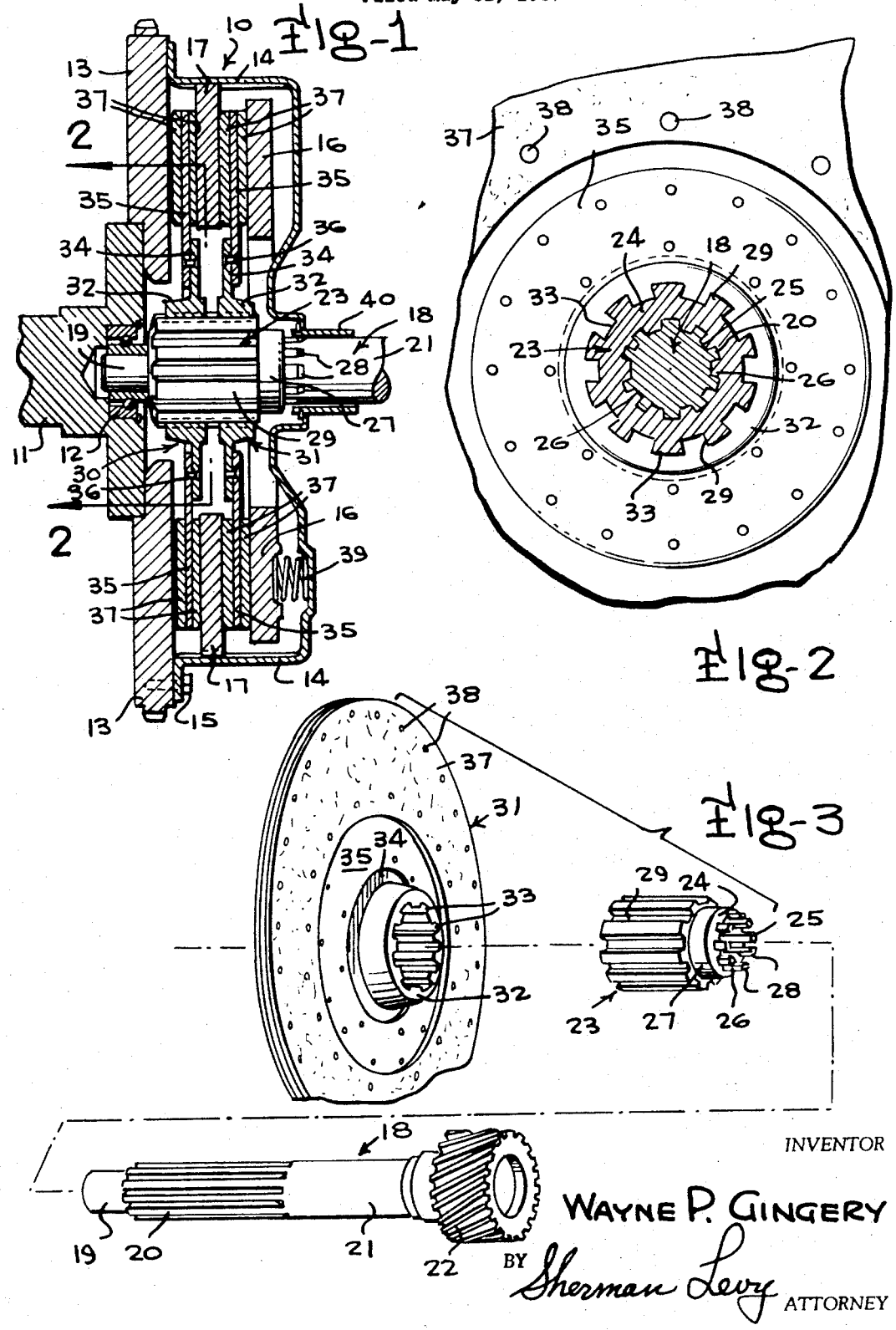

3,465,860
DUAL SPLINED SHAFT ASSEMBLY FOR A CLUTCH
Wayne Paul Gingery, La Puenta, Calif., assignor to Clutch Research and Development Co., Los Angeles, Calif., a partnership
Filed May 31, 1967, Ser. No. 642,363
Int. Cl. F16d 13/58, 13/52
U.S. Cl. 192—70.16                                    1 Claim

ABSTRACT OF THE DISCLOSURE

A dual splined sleeve which will protect the original shaft from damage due to high engine torque, and wherein greater lateral resistance is provided.

BACKGROUND OF THE INVENTION

The present invention pertains to class 64, subclasses 1, 9 and 23; class 287, subclass 53; class 74, subclasses 595 and 640; class 192, subclasses 20 and 30.

DESCRIPTION OF THE PRIOR ART

The prior art includes the following prior patents: 1,149,881; 1,912,412; 2,072,090; 2,415,893; 2,515,366; 2,772,547; 2,773,369; 2,952,999; 2,993,579; 2,698,013; 3,020,775; 3,024,626; 3,120,570; 3,210,136; 3,263,450; 3,273,415; and 3,293,884.

Some of the differences or advantages that the present invention has over those prior patents is as follows:

By means of the present invention, the transmission front drive shaft can withstand the additional forces for increased periods of time and, in addition, failure of the driven plates which attach to the friction discs of the clutch proper will be eliminated. Also, with the present invention the original shaft will be protected from damage due to high engine torque, and the dual splined sleeve of the present invention will have the advantage of greater lateral resistance to impact. Furthermore, the dual splined sleeves are expendable, and hence will eliminate the need of replacing expensive parts and the attendant labor cost. Also, in addition the dual splined sleeve can be installed at any time in the life of the equipment without the necessity of shaft replacement.

SUMMARY OF THE INVENTION

In accordance with the present invention there is provided a clutch superdrive which will permit the transmission front drive shaft to withstand increased forces and, in addition, the present invention will help eliminate the premature failure of parts such as the driven plates which attach to the friction discs of the clutch proper. The present invention is readily adaptable to any of the well-known domestic or other transmissions which use a plate clutch.

BRIEF DESCRIPTION OF THE DRAWINGS

FIG. 1 is a cross-sectional view of a clutch, constructed according to the present invention.

FIG. 2 is a sectional view taken on the line 2—2 of FIG. 1.

FIG. 3 is an exploded perspective view of certain constructional details of the present invention.

DESCRIPTION OF THE PREFERRED EMBODIMENT

Referring in deail to the drawings, the numeral 10 indicates a clutch assembly which is adapted to be used in a suitable location such as in conjunction with a transmission of a truck engine or the like, and as shown in FIG. 1, the numeral 11 indicates an input shaft element which has a pilot bearing 12 contiguous thereto, and the numeral 13 indicates a flywheel which is arranged adjacent the shaft element 11. The numeral 14 indicates a retainer which may be affixed to the flywheel 13 in any suitable manner, as for example by means of securing elements 15. There is further provided a pressure plate 16 which is spaced from the flywheel 13, and a conventional center plate 17 is interposed between the pressure plate 16 and and the flywheel 13. The numeral 18 indicates a shaft member which has a reduced diameter, smooth end portion 19 which is contiguous to the pilot bearing 12, and the shaft member further includes an intermediate splined portion 20, as well as a smooth section or portion 21, and a gear 22 on the end of the shaft member 18 is adapted to be used for actuating the transmission in the usual manner.

In accordance with the present invention, there is provided a dual splined sleeve 23 which includes a main body portion 24 that has a hollow interior 25 for the projection therethrough of the shaft member 18. The sleeve 23 has inwardly disposed spaced parallel longitudinally extending splines 26 which interfit and interengage with the splines 20 of shaft member 18, as shown in FIG. 2 for example.

The sleeve 23 further includes a smooth portion 27 and the inner splines 26 project or extend outwardly beyond the smooth portion 27 as indicated by the numeral 28. The sleeve 23 is further provided on its outer surface with spaced parallel longitudinally extending splines or ribs 29 for a purpose to be later described.

There is further provided a pair of spaced parallel clutch driven members 30 and 31 which each have a centrally disposed hub 32 that is provided with inwardly directed splines 33 for coaction and engagement with the outer splines 29 of the sleeve 23. The clutch driven members 30 and 31 further each include circular flange sections 34 which have carrier discs 35 affixed thereto as at 36, and facings 37 are adapted to be secured to the carrier disc 35 as by means of rivets 38.

From the foregoing, it will be seen that there has been provided a clutch superdrive, and in use with the parts arranged as shown in thed rawings it will be noted that in accordance with the present invention there is provided the dual splined sleeve 23 and the associated parts. Thus, the sleeve 23 has the splines 26 which mesh and engage with the splines 20 on the shaft member 18. Also, the sleeve 23 has the outer splines 29 which mesh with and are engaged by the splines 33 of the pair of clutch driven members 30 and 31. In the drawings in FIG. 3 the numeral 39 indicates spring members which are adapted to engage the pressure plate 16.

By way of background of the present invention the following is submitted:

Recently in the last few years the truck engine industry has gradually increased the H.P. ratings of their diesel equipment up to a point where the tremendous increase in engine torque has caused the balance of the gear train to be subjected to stresses for which it was not originally designed. In one area in particular, namely, the transmission front drive shaft has not been able to withstand the new added forces for any appreciable length of time. In addition, a second or further point of premature failure are the driven plates which attach to the friction discs of the clutch proper. With the present invention, these deficiences or shortcomings are overcome, and these may be considerably expensive in terms of initial cost and protection of the original of the factory assembly or equipment.

With further reference to the drawings, the dual splined sleeve 23 has its inner diameter machined to the size and tolerances of the original drive shaft such as the shaft 18. The splined end of this shaft is approximately 4" long. However, only the approximate middle one-third of the length of the spline 20 gradually deforms in a radial manner as a result of the tremendous force exerted when the clutch is engaged. The end result of this continuous impact ultimately causes deformation to the extent that the driven plates will not move on the shaft when released by the pressure plate 16, but rather will hang up in the deformations and as a result the clutch remains firmly locked in an engaged status or location. The dual splined sleeve 23 of the present invention will overcome this defect or shortcoming in the following ways or manner:

First, it will protect the original shaft 18 from damage due to high engine torque, possibly as long as the transmission remains in service, and this is because the entire length of the original splines will be engaged and not subjected to the severe pounding which heretofore took place.

Second, the dual splined sleeve 23 will have the distinct and important advantage of greater lateral resistance to impact because of the increased diameter and resulting weight of metal between each spline and thus longer life will be assured.

Third, the dual spline sleeves 23 are expendable, and hence they will preclude the necessity of replacing a very expensive part as well as eliminating an extremely high labor cost especially on the highway when disassembly and reassembly of the transmission would not be necessary because the drive shaft would not have to be replaced.

Fourth, the dual splined sleeves 23 will have the unique feature or advantage that they can be installed at any time within the life of the equipment without the down time for shaft replacement or the like.

In the drawings there is illustrated a companion device made necessary by the increase in diameter of the dual splined sleeve 23. The driven plates or members 30 and 31 are the second most troublesome spots in clutch assemblies due to the shear in the rivets which connect the plates to the friction discs. In the driven plates of the present invention the number of rivets has been increased and the distance between rivets has also been increased and this assures that greater shear values are attained. It is to be noted that the hub diameter has been increased to accommodate the dual splined drive.

Further, these previous two components are not designed to be accessories for any particular existing manufacturer's equipment and, in fact, they are readily adaptable to any of the well-known domestic transmissions using a two-plate clutch.

In the present invention the parts are arranged or constructed so as to insure long life or quiet movement between the parts, and the parts are engineered to work together in the desired manner to provide or assure durable trouble-free use.

The parts can be made of any suitable material and in different shapes or sizes.

The pressure plate 16 is part of the existing clutch, and the flywheel 13 is likewise a conventional part of a two-plate clutch assembly. Four friction facings 37 are provided. As shown in the drawings, there is provided the clutch driven member 30 for the flywheel side, and there is also the clutch driven member 31 for the pressure plate side. There is also two facing carriers 35 which are in the form of flat metal discs that are fastened to the hub and hold the friction facings. The numeral 17 indicates the existing center plate. The clutch sleeve retainer 14 and part 40 are parts of the existing clutch assembly. The splined sleeve 23 is machined to fit inside the clutch sleeve retainer and allow it to move as the clutch wears. The splined sleeve 23 is machined to permit free movement of the clutch sleeve part 40 and prevent the splined sleeve 23 from moving backwards. There is a chamfer to protect the existing pilot bearing 12, and this is part of the flywheel 13. The spline in the inside of the chamfer contact inside the bearing serves to keep the sleeve from moving forward. Parts such as the parts 28 and opposite end portion of the splined sleeve serve to hold the splined sleeve on the existing input shaft so as to prevent movement thereof.

It is to be noted that with the parts arranged as shown in the drawings, normally the shaft element 11 is continuously rotating, and it is to be understood that the shaft member 18 only rotates when the clutch 10 is properly actuated or engaged. Also, with the present invention in the event that repairs have to be made, it is only necessary generally to remove and replace the spline sleeve 23 so that it is not necessary to replace the entire clutch. In addition, as previously stated, the present invention includes the previously mentioned clutch driven members which have the inner splines 33 for engaging the outer splines 29 on the sleeve 23, and, in addition, the clutch drive members 29 and 30 have the improved mounting means for the friction facings 37.

It will now be clear that there is provided a device which accomplishes the objectives heretofore set forth. While the invention has been disclosed in its preferred form as described and illustrated herein it is not to be considered in a limited sense as there may be other forms or modifications of the invention which should also be construed to come within the scope of the appended claim.

What is claimed is:

1. In a clutch for a movable vehicle such as a truck, an input shaft element, a pilot bearing positioned adjacent to said input shaft element, a flywheel arranged contiguous to said shaft element, a retainer positioned contiguous to said flywheel and connected to said flywheel, a pressure plate arranged in spaced apart relation with respect to said flywheel, a center plate positioned between said flywheel and said pressure plate, a shaft member provided with a reduced diameter smooth end portion, said smooth end portion being arranged in engagement with said pilot bearing, said pilot bearing including an outer race and an inner race, the outer race being axially shorter than said inner race thereby providind an axial space between said outer race and a sleeve, said shaft member further embodying an intermediate splined portion, a smooth section positioned adjacent to said splined portion; said sleeve being a dual splined expendable sleeve embodying a main body portion having a hollow interior for the projection therethrough of said shaft member, said sleeve being provided with inwardly disposed splines engaging the splines on said shaft member throughout the entire length of the splines on the shaft member, said sleeve further including a smooth portion, the inner splines on the sleeve extending outwardly beyond the smooth portion of the sleeve, said sleeve further being provided with a plurality of spaced longitudinally extending splines on the outer surface thereof, a pair of spaced apart clutch driven members each having an inwardly splined hub arranged in engagement with the outer splines of said sleeve, said center plate being interposed between said pair of clutch driven members, said clutch driven members each having a circular flanged section having a carrier disc affixed thereto, and friction facings affixed to both sides of each of said carrier discs by rivets, said hub having sufficient diameter for receiving and accommodating therein said dual splined shaft, said sleeve serving to help prevent distortion of the shaft member and also protect the shaft member from damage due to torque.

References Cited

UNITED STATES PATENTS

| | | | |
|---|---|---|---|
| Re. 19,876 | 3/1936 | Criley | 192—70.2 XR |
| 1,732,965 | 10/1929 | Carhart | 192—70.2 |
| 1,903,963 | 4/1933 | Emrick | 192—70.2 |
| 1,969,149 | 8/1934 | Pearmain | 192—70.19 |
| 2,025,098 | 12/1935 | Dudick | 192—70.2 XR |
| 2,090,265 | 8/1937 | Padgett | 192—70.2 XR |
| 2,948,557 | 8/1960 | Howe et al. | 192—67 XR |
| 3,233,477 | 2/1966 | O'Brien | 192—70.2 XR |

MARTIN P. SCHWADRON, Primary Examiner

L. J. PAYNE, Assistant Examiner

U.S. Cl. X.R.

192—70.2